United States Patent

Komline, Sr. et al.

[11] 3,723,712
[45] Mar. 27, 1973

[54] METHOD FOR AGGLOMERATION MEASURING AND CONTROL

[75] Inventors: Thomas R. Komline, Sr., Gladstone; Walter R. Wills, Cedar Knolls, both of N.J.

[73] Assignee: Komline-Sanderson Engineering Corporation, Peapack, N.J.

[22] Filed: Oct. 12, 1971

[21] Appl. No.: 188,516

[52] U.S. Cl. ............235/151.31, 73/61.4, 204/149, 204/195 R, 204/299, 210/85, 324/92, 324/109
[51] Int. Cl.....G06f 15/46, G01n 21/28, G01n 33/16
[58] Field of Search..........204/180 B, 195 R, 195 B, 204/195 L, 299, 149; 73/61.4; 210/85; 324/92, 109; 235/151.3, 151.31

[56] References Cited

UNITED STATES PATENTS 3,394,310  7/1968  Baker et al. ....................324/109 X
3,572,930  3/1971  Morcom et al. ..................73/61.4 X Primary Examiner—Malcolm A. Morrison
Assistant Examiner—R. Stephen Dildine, Jr.
Attorney—Watson, Cole, Grindle & Watson

[57] ABSTRACT

The apparatus extracts samples of a fluid stream containing colloidal suspended solids at a detection station wherein the electrophoretic mobility (EM) of the colloidal suspended solids is determined. The detection station automatically measures the EM and provides such data to a computer, which computes the Zeta Potential. The computer also receives other information relating to the characteristics of the colloidal suspended solids, such as temperature, the percent of solids, and the flow rate of the fluid system. The computer is programmed to interpret the input data and to provide corrective signals to processing apparatus which automatically adjust and control the additives fed into the fluid stream to achieve automatic flocculation correction so that the agglomeration of the colloidal suspended solids in the fluid stream is optimized.

6 Claims, 2 Drawing Figures

METHOD FOR AGGLOMERATION MEASURING AND CONTROL

This invention relates to methods for optimizing conglomeration of any fluid stream containing colloidal suspended solids and, more particularly, to a method determining the Zeta Potential of colloidal suspended solids from their electrophoretic mobility and a method for the continuous analysis and selection of correction measures in accordance with the Zeta Potential to automatically control and select the additives fed into the process or stream to achieve an optimized agglomeration.

The method of the invention determines the Zeta Potential of colloidal suspended particles or aggregates of colloidal suspended particles in a fluid stream. The diameter of the particles and aggregates of interest is, in most cases, in the range of one to 50 microns. It is well known that particles of activated sludge or untreated, raw sewage possess an electric charge that can be accurately determined in an electrophoresis cell. It is also recognized that the mechanics of measurement for concentrated suspensions differ somewhat from the standard methods employed for the measurement of Zeta Potential of dilute colloidal suspensions. That is, if a sludge is too dense to be viewed optically in an electrophoresis cell, it may be necessary to treat the sludge in some way to make it less dense so that optical detection of the particles is possible.

A dense sludge can be viewed optically by first separating the liquid phase from the solid and then returning a small portion of the solid to a large portion of the liquid to give a suspended solids concentration of about 100 parts per million. The liquid-solids separation may be achieved by filtration, centrifugation, or any other method which does not alter the electrolytic composition of the liquid phase. Simple dilution with water from another source in most cases changes the electrolytic balance and as a result the Zeta Potential is also changed.

The invention provides methods for sampling any fluid stream containing colloidal suspended solids and detecting the electrophoretic mobility of the suspended solids. Information relating to the motion of the suspended particles is converted into electrical signals and fed to a suitably programmed computer which determines the velocity of the particles, and in conjunction with other information relating to the characteristics of the suspended solids, such as the percentage of sludge and the rate of flow of the fluid stream, generates appropriate control signals which are then fed to corrective apparatus for altering the addition of additives into the process or stream to optimize the agglomeration of the colloidal suspended solids. The methods disclosed herein are particularly suitable for water and sewage treatment plants, industrial waste treatment, industrial solids recovery and/or other industrial process applications.

OBJECTS

It is a primary object of this invention to provide methods for the automatic optimization of agglomeration or stabilization in any fluid stream containing colloidal suspended solids.

It is a second object of this invention to provide methods for automatically determining the Zeta Potential of suspended solids in a fluid stream from a determination of the electrophoretic mobility of the suspended solids.

A third object of the invention is to provide greatly improved methods for automatically determining the electrophoretic mobility of colloidal suspended solids in any fluid stream.

A fourth object of the invention is to provide improved automatic and more versatile control of the agglomeration or stabilization of any fluid stream containing colloidal suspended solids.

BRIEF DESCRIPTION OF THE FIGURES

FIG. 1b illustrates a preferred embodiment of the control system disclosed in FIG. 1a.

DETAILED DESCRIPTION OF THE INVENTION

Figure 1A:
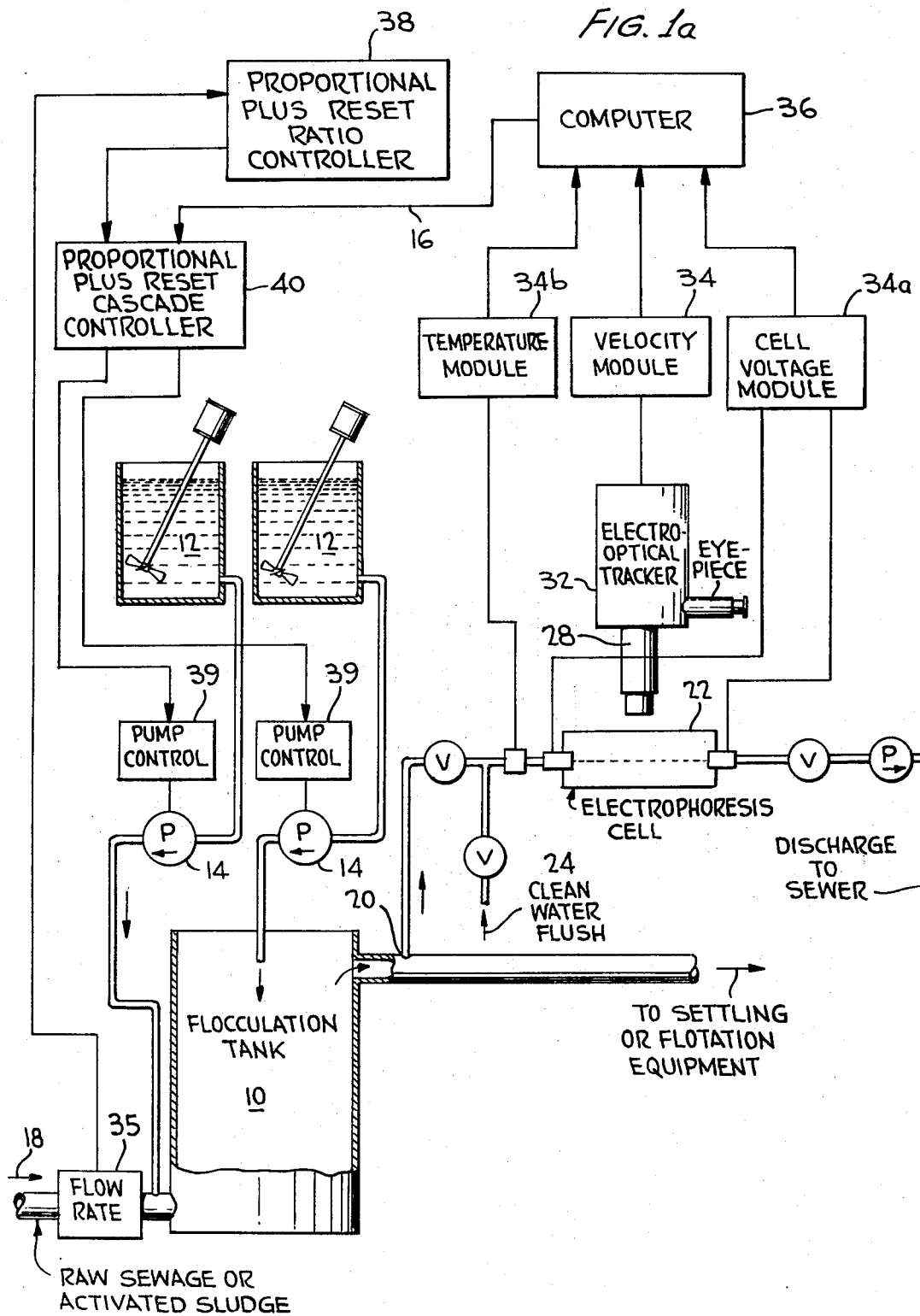
FIG. 1a is a combined block and diagrammatic illustration of an embodiment of a measuring and agglomeration control system in accordance with the invention.

Influent (sludge) is pumped into flocculation tank 10 where it is treated by suitable flocculents from flocculent storage tanks 12 by means of flocculent feed pumps 14 which are controlled by computer signals on line 16 to alter the flocculent pumped into the flocculation tank. The conditioned sludge is pumped from flocculation tank 10 via sampling port 20 to be pumped into electrophoresis cell 22. The unsampled sludge is pumped to settling or flotation equipment (not shown). Provision is made for diluting sludge from flocculation tank 10 with water to improve the optical density of the sludge so that the colloidal suspended solids therein may be optically viewed or tracked in electrophoresis cell 22. For this purpose as well as to purge the electrophoresis cell, clean water flush 24 is provided.

Lens system 28 magnifies the colloidal motion sufficiently so as to produce an image which is scanned by an electro-optical scanner or tracker 32. Scanner 32 is essentially a photomultiplier tube with servo circuitry for locking onto and tracking a dark or a light spot and providing displacement data thereof in both X and Y-directions. The displacement data is converted by velocity module 34 into rate of displacement and produces signals proportional to dx/dt and dy/dt. The rate of displacement data in turn is fed to programmed computer 36 and combined with the voltage of electrophoresis cell 22 and sample temperature data respectively from cell voltage module 34a and temperature module 34b to compute the Zeta Potential. A waste stream flow rate signal is fed from flow rate sensor 35 to proportional plus reset ratio controller 38 which delivers a signal to proportional plus reset cascade controller 40. The ZP signal from computer 36 is also fed to cascade controller 40 and the resultant control signal regulates the speed of pumps 14 by means of pump controls 39.

Scanner 32 may comprise a series 800 Electro-Optical Motion tracker as manufactured by the Optron Corporation. Electrophoresis cell 22 is positioned on the stage of a microscope and the optical head of the tracker is positioned to receive the magnified image. The output of tracker 32 is an analog voltage of ± 5 volts and is proportional to the displacement of a tracked object or objects along the X or Y-axis, or both axes simultaneously. Velocity module 34 may simply comprise a differentiating circuit to generate a signal representing the differentiation of the tracker output voltage. The differentiated signals are stored in computer 36. The computer calculates an average velocity from the stored data and then calculates the corresponding Zeta Potential from an equation described below.

Figure 1B:
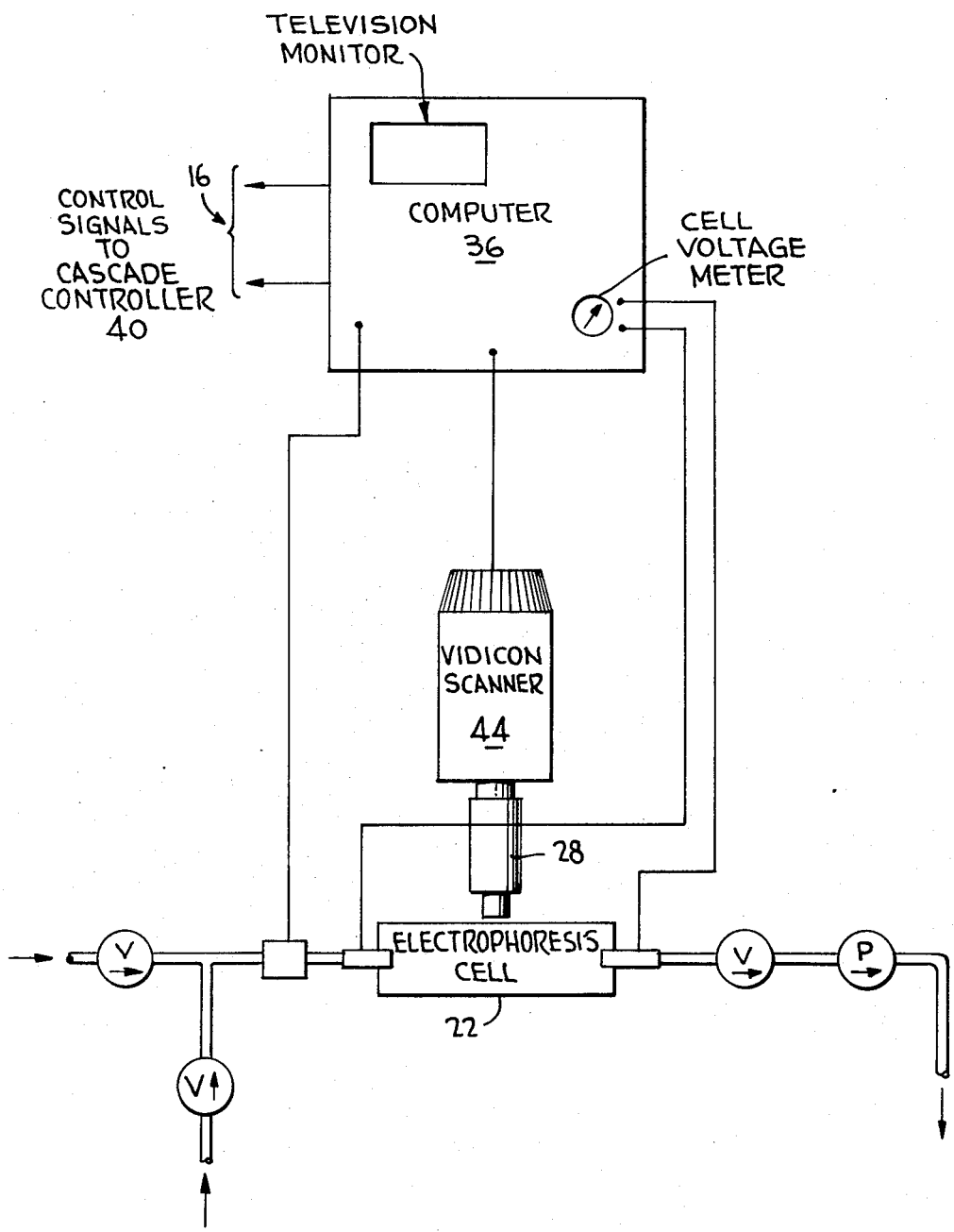

FIG. 1b illustrates a preferred embodiment of scanning and tracker apparatus 32 for measuring the velocity of particle migration within the electrophoresis cell. In this embodiment the scanner comprises the πMC particle measurement computer manufactured my Millipore, a subsidiary of Bausch and Lomb. As in the aforedescribed embodiment, electrophoresis cell 22 is placed on the stage of a microscope 28 and the magnified image is scanned by video scanner 44, which is part of the πMC system. A computer associated with video scanner 44 identifies each particle and locates its position from the coordinates of the tangent of the lower portion of the particle. The particle location coordinates are stored in computer 36. An average velocity determination is made by determining the total distance travelled by the particles divided by the total number of particles divided by the time interval between observations. The computer associated with video scanner 44 already has the capability of performing division and multiplication. Therefore, it can be programmed to determine particle velocity and supply such data to computer 36 wherein the Zeta Potential for the suspended particles is calculated. The flow rate and Zeta Potential signals are processed by controllers 38 and 40 as in FIG. 1a to produce control signals for pumps 14.

THE DERIVATION OF THE WORKING EQUATIONS FOR DETERMINING ZETA POTENTIAL

The classical expression for electroosmotic velocity of a fluid caused by a voltage gradient is:

$$v_e = [-DE(ZP)/4\pi n]$$

where: $v_e$ = electroosmotic velocity, $D$ = dielectric constant of the medium, $E$ = electric field strength, $ZP$ = zeta potential, $n$ = viscosity of the medium. The above equation can be used to determine Zeta Potential by rewriting it as follows:

$$ZP = -[4\pi L/D](v_e/V) n$$

In this equation E, the field strength, is replaced by V/L, the voltage divided by the distance between the electrodes. In all our work we have taken 22.5° C as our reference temperature and all Zeta Potential measurements are corrected to 22.5°. In this way the ZP equation becomes:

$$ZP = -[4\pi Ln/D](v_e/V)(c)$$

where $n$ is the viscosity at 22.5° and $c$ is a correction factor for the change of viscosity with temperature. Now the equation is in a form that can be used by a computer to automatically determine ZP on the basis of three input signals, particle velocity (electroosmotic velocity), cell voltage, and temperature. In the case of the first embodiment, the particle velocity signal will be analog and proportional to velocity so the basic ZP equation will be:

$$ZP = -K_1 (v_e/V)(1.45 - 0.02t_c)$$

where: $K_1 = 4\pi Ln/D$, so $K_1$ is a function of the cell dimensions and the time and distance units used in the equation.

With the second and preferred embodiment, there are two choices of signal proportional to velocity (1) the average distance travelled by the particles in a predetermined time or (2) the average time required for the particles to travel a predetermined distance. The equations for calculating ZP in these two cases are as follows:

$$ZP = -K_2 (d/V)(1.45 - 0.02t_c) \quad (1)$$

where $d$ is the average distance travelled and the predetermined time is included in the constant $K_2$.

$$ZP = (-K_3/TV)(1.45 - 0.02t_c) \quad (2)$$

where T is the average time required for the particles to travel. The predetermined distance is included in the constant $K_3$.

DETERMINING THE PROPER SET POINT ZETA POTENTIAL FOR OPTIMUM AGGLOMERATION

Most suspensions of particles that are to be agglomerated for settling or flotation have an average Zeta Potential of −25 to −50 millivolts. This means that there is a fairly strong negative charge on each individual particle that repels any other approaching particles. It has been found that when the Zeta Potential is less than −20mv, there is a much stronger tendency for particles to agglomerate. When the Zeta Potential of a suspension is between −10 and −15 mv, the suspension is said to be at the threshold of agglomeration, but its tendency to agglomerate depends on the individual suspension properties and the type of agitation given to it. The actual Zeta Potential at which agglomeration begins, if this indeed occurs at a sharp point, must be determined empirically for each suspension. Strong agglomeration and precipitation occur in the Zeta Potential range of −5 to +5 mv. As the Zeta Potential increases in the positive direction, the repelling forces again increase and the tendency to agglomerate drops off.

The average charge on the particles is a function of the surface properties of the particle material and the amount and type of dissolved substances in the suspension, and it is the result of preferential adsorption of anions around the solid particles and solvation of cations by the water molecules.

Most commonly used flocculents owe their effectiveness to their ability to alter the charge on suspended particles by adding a surplus of positively charged cations to the suspension. The positive charges neutralize the existing negative charges and cause the Zeta Potential to approach zero. However, in most cases, it is a waste of flocculent to bring the Zeta Potential to zero. Some of the best known flocculents are compounds containing ferric ions such as $FeCl_3$, compounds containing aluminum ions such as $Al_2(SO_4)_3$ and $AlCl_3$, and various cationic polyelectrolytes such as Dow Purifloc C31 and Rohm and Haas C7.

With automatic and continuous monitoring of Zeta Potential and control of the rate of flocculent addition based on a set point Zeta Potential, the minimum amount of flocculent is consumed to achieve the maximum benefit. In general, the set point for agglomeration control is −11 mv, but this is flexible to allow for unusual conditions.

What is claimed is:

1. A method for determining the Zeta Potential of suspended colloidal particles comprising the steps of:
    a. establishing a predetermined voltage gradient along an electrophoresis cell positioned on a microscope stage,
    b. introducing a sample of said suspended colloidal particles into said cell,
    c. scanning a microscopic image of said colloidal particles within said cell,
    d. tracking said particles to determine their movement,
    e. storing data representative of said particle movement;
    f. calculating the particle velocity from said data, and
    g. determining the Zeta potential from said particle velocity, the voltage gradient of said cell, and the temperature of said suspended colloidal particles sample.

2. A method as in claim 1 wherein said particle velocity is determined from the total distance travelled by the individual particles and dividing said total distance by the number of particles observed during a fixed observation period.

3. The method as in claim 1 wherein said particle velocity is determined by differentiating a signal representative of said particle displacement with respect to time to provide a signal proportional to the rate of change of particle displacement.

4. A method as in claim 1 wherein the Zeta Potential is determined from the following formula:
$ZP = -K_1 (V_e/V) (1.45 - 0.02t_c)$ and wherein $K_1 = 4\pi L n/D$, $V_e$ is the electrophoretic velocity of said particles,
  $V$ is the voltage across said cell, $t_c$ is the temperature of said sample, $L$ is the length of said cell, $D$ is the dielectric constant of said sample, and $n$ is the viscosity of said sample.

5. A method as in claim 1 wherein the Zeta Potential is determined from the following formula:
$ZP = -K_2 (d/V) (1.45 - 0.02t_c)$ wherein $K_2 = 4\pi L n/D$, $d$ is the distance travelled during a predetermined observation interval, $V$ is the voltage of said cell, $t_c$ is the temperature of said sample, $L$ is the length of said cell, $n$ is the viscosity of said sample and $D$ is the dielectric constant of said sample and where $K_2$ includes said predetermined observation interval.

6. A method as in claim 1 wherein the Zeta Potential is determined from the following formula:
$ZP = (K_3/TV) (1.45 - 0.02t_c)$ wherein $-K_3 = 4\pi L n/D$, $T$ is the average time required for the particles to travel a predetermined distance, $V$ is the voltage across said cell, and $t_c$ is the temperature of said sample, $L$ is the length of said cell, $n$ is the viscosity of said sample and $D$ is the dielectric constant of said sample and wherein $K_3$ includes said predetermined distance.

* * * * *